United States Patent
Aneja et al.

(10) Patent No.: US 12,398,040 B2
(45) Date of Patent: Aug. 26, 2025

(54) FUNCTIONALISED GRAPHENE AND COATINGS COMPRISING THE SAME

(71) Applicant: TALGA TECHNOLOGIES LIMITED, Cambridge (GB)

(72) Inventors: Karanveer Aneja, Cambridge (GB); Sivasambu Bohm, Godmanchester (GB); Henegama Llyanage Mallika Bohm, Godmanchester (GB)

(73) Assignee: TALGA TECHNOLOGIES LIMITED, Cambridge (GB)

( * ) Notice: Subject to any disclaimer, the term of this patent is extended or adjusted under 35 U.S.C. 154(b) by 731 days.

(21) Appl. No.: 17/605,534

(22) PCT Filed: Apr. 24, 2020

(86) PCT No.: PCT/GB2020/051010
§ 371 (c)(1),
(2) Date: Oct. 21, 2021

(87) PCT Pub. No.: WO2020/217061
PCT Pub. Date: Oct. 29, 2020

(65) Prior Publication Data
US 2023/0044239 A1 Feb. 9, 2023

(30) Foreign Application Priority Data
Apr. 24, 2019 (GB) .................................. 1905720

(51) Int. Cl.
*C08K 9/06* (2006.01)
*C01B 32/184* (2017.01)
*C01B 32/194* (2017.01)
*C08K 3/04* (2006.01)
*C09C 3/12* (2006.01)
(Continued)

(52) U.S. Cl.
CPC .......... *C01B 32/184* (2017.08); *C01B 32/194* (2017.08); *C08K 3/042* (2017.05); *C08K 9/06* (2013.01); *C09C 3/12* (2013.01); *C09D 5/084* (2013.01); *C09D 7/61* (2018.01); *C09D 163/00* (2013.01)

(58) Field of Classification Search
CPC .................................. C08K 9/06; C08K 3/042
See application file for complete search history.

(56) References Cited

U.S. PATENT DOCUMENTS 9,725,603 B2   8/2017 Virtanen
12,024,648 B2  7/2024 Wang et al.
(Continued)

FOREIGN PATENT DOCUMENTS

CN   102351174 A  *  2/2012
CN   106497311 A  *  3/2017 ............... C08K 3/04
(Continued)

OTHER PUBLICATIONS

Ma et al. CN10235117 translation. Feb. 2012 (Year: 2012).*
(Continued)

*Primary Examiner* — Cachet I Proctor
(74) *Attorney, Agent, or Firm* — Notaro, Michalos & Zaccaria P.C.

(57) ABSTRACT

A method of preparing functionalised graphene is disclosed. The method includes the step of functionalising graphene with a chemical linker when the graphene is in a substantially dry condition.

8 Claims, 2 Drawing Sheets

Graphene based/reduced Zinc Epoxy Coatings

(51) Int. Cl.
*C09D 5/08* (2006.01)
*C09D 7/61* (2018.01)
*C09D 163/00* (2006.01)

(56) References Cited

U.S. PATENT DOCUMENTS

| | | | |
|---|---|---|---|
| 2011/0017955 A1* | 1/2011 | Zhamu | C08G 59/5033 |
| | | | 252/182.13 |
| 2011/0186807 A1 | 8/2011 | Bowers et al. | |
| 2012/0330044 A1* | 12/2012 | Hou | B82Y 30/00 |
| | | | 556/418 |
| 2016/0240278 A1* | 8/2016 | Lee | C09J 9/02 |
| 2016/0312038 A1* | 10/2016 | Böhm | C23C 26/00 |
| 2018/0215623 A1 | 8/2018 | Lock et al. | |
| 2018/0354785 A1 | 12/2018 | Kinloch et al. | |
| 2019/0161354 A1* | 5/2019 | Bohm | C01B 32/225 |
| 2019/0233702 A1 | 8/2019 | Xu et al. | |
| 2020/0239707 A1* | 7/2020 | Bohm | C01B 32/194 |

FOREIGN PATENT DOCUMENTS

| | | | |
|---|---|---|---|
| CN | 107266713 A | | 10/2017 |
| CN | 108395804 A | | 8/2018 |
| CN | 108439385 A | * | 8/2018 |
| CN | 109082123 A | | 12/2018 |
| CN | 109608816 A | | 4/2019 |
| CN | 109627680 A | | 4/2019 |
| CN | 109627698 A | | 4/2019 |
| EP | 2822893 A2 | | 1/2015 |
| EP | 3492533 A1 | | 6/2019 |
| JP | 2002146233 A | | 5/2002 |
| JP | 2003275555 A | | 9/2003 |
| JP | 2013220971 A | | 10/2013 |
| JP | 2015529610 A | | 10/2015 |
| JP | 2019524632 A | | 9/2019 |
| JP | 2021523961 A | | 9/2021 |
| JP | 2022519146 A | | 3/2022 |
| WO | WO2013132260 A2 | | 9/2013 |
| WO | WO2018019905 A1 | | 2/2018 |
| WO | WO2019006044 A1 | | 1/2019 |
| WO | WO-2019020999 A1 | * | 1/2019 ............ C01B 32/19 |
| WO | 2019072833 A1 | | 4/2019 |
| WO | 2020108552 A1 | | 6/2020 |
| WO | 2020165800 A2 | | 8/2020 |
| WO | WO2020193719 A1 | | 10/2020 |

OTHER PUBLICATIONS

Anonymous: BYK—9076—Byk (AltanaGroup)—datasheet, Dec. 18, 2017 (Dec. 18, 2017), XP055717499, Retrieved from the Internet: URL:https://coatings.specialchem.com/produ ct/a-byk-altana-group-byk-9076, retrieved on Jul. 23, 2020.

Guler, Muhammet et al, "Palladium nanoparticles decorated (3-aminopropyl)triethoxysilane functionalized reduced graphene oxide for electrochemical determination of glucose and hydrogen peroxide", Journal of Electroanalytical Chemistry, Elsevier, 834 (2019) pp. 49-55.

Zhang, Jinhui et al., "Mixed matrix membranes comprising aminosilane-functionalized graphene oxide for enhanced $CO_2$ separation", Journal of Membrane of Science, Elsevier, 570-571 (2019) pp. 343-354.

International Search Report and Written Opinion for corresponding PCT application No. PCT/GB2020/051010, mailed Aug. 14, 2020.

RSC Advances, vol. 8, 2018, E. Cunha et al., "The chemical functionalization of graphene nanoplatelets through solvent-free reaction", pp. 33564-33573.

Nanoscale Advances, vol. 1, 2019, H. Ren et al., "Surface functionality analysis by Boehm titration of graphene nanoplatelets functionalized via a solvent free cycloaddition reaction", pp. 1432-1441.

Nature Materials, vol. 17, No. 11, 2018, Liu Pingwei et al., Autoperforation of 2D materials for generating two-terminal memristive Janus particles, pp. 1005-1012.

Japanese Office Action for Patent application No. 2021-563345 with Machine Translation.

* cited by examiner

FUNCTIONALISED GRAPHENE AND COATINGS COMPRISING THE SAME

TECHNICAL FIELD OF THE INVENTION

The present invention relates to a method of producing functionalised graphene, to a functionalised graphene composition, to a method of reducing the content of metallic pigments in a coating composition, to a coating composition comprising the functionalised graphene, to a coated article comprising a coating layer formed from the coating composition, to a method of producing the coated article and to the use of the functionalised graphene as a replacement for metallic pigments in a coating layer.

BACKGROUND TO THE INVENTION

Epoxy based coatings are most commonly used as organic primers on marine vessels and in the marine industry, and typically comprise metallic pigments such as zinc and aluminium to improve the corrosion resistant properties of the coatings when in use. Although coatings with a high zinc content (both pre and post fabrication) tend to exhibit very good corrosion protection, it is often necessary to reduce the zinc content in order to prevent against splashing and the generation of ZnO fumes during welding operations for example. The incorporation of high quantities of zinc is also known to result in brittle coatings being formed which is undesirable since this will reduce the service life of the coating and the coated structure. It is also understood that the service life of structures provided with epoxy/zinc coatings is limited by the zinc content in the coating and that under normal circumstances reducing the zinc content will reduce the service life of the coated structure. Moreover, since zinc is amphoteric it will corrode preferentially in both acidic and basic environments and therefore at a much higher rate relative to many other metallic pigments. As such, the service life of structures provided with epoxy coatings comprising zinc may be reduced. In addition, and in the case of water based epoxy/zinc primers, large quantities of zinc are needed because a proportion of the zinc will react with oxygen to form zinc oxide. This not only increases the cost of producing the coated structure but also limits the effectiveness of these water based systems.

It is an object of embodiments of the present invention to provide a corrosion protective coating that contains reduced quantities of metallic pigments. It is also an object of embodiments of the present invention to reduce the metallic pigment content without reducing the corrosion protective and mechanical properties (including adhesion properties) of the coating. It is another object of embodiments of the present invention to provide a corrosion protective coating which is able to protect an underlying structure from corrosion for extended periods of time. It is a further object of embodiments of the present invention to provide an eco-friendly, light weight and cost effective method for producing coated structures.

SUMMARY OF THE INVENTION

According to a first aspect of the invention there is provided a method of preparing functionalised graphene, the method comprising the step of functionalising graphene with a chemical linker when the graphene is in a substantially dry condition.

Functionalising graphene in this way enables the functionalised graphene to be incorporated as a 'ready mix' ingredient in any resin system irrespective of the mixing ratios. It also avoids or at least significantly minimises the use of solvents. Therefore issues surrounding the handling of solvents and their disposal are likewise avoided. The agglomeration of graphene is known to result in the formation of a galvanic couple with bare metal which can increase the rate of corrosion. By functionalising graphene with the chemical linker, it is able to bond with a binder, e.g. a resin and/or a hardener, which helps to ensure that the graphene is effectively dispersed and does not agglomerate in the binder. Moreover, since functionalisation is carried out with graphene in a substantially dry condition, rather than it being dispersed in a solvent, reduced quantities of the chemical linker are needed for functionalising graphene which helps to reduce costs.

The graphene may comprise graphene nanoplatelets. The graphene nanoplatelets may be provided in powder form.

The graphene may be oxide-free graphene or "pristine" graphene. Alternatively, the graphene may be partially oxidised graphene or a limited oxygen content graphene (<5%). These do not include graphene that has been reduced from graphene oxide since residual oxide will inevitably remain following the reduction step. The use of oxide-free graphene instead of graphene oxide (GO) or reduced graphene oxide (RGO) is understood to improve the corrosion protective and mechanical properties of coatings in which it is incorporated. Moreover, and relative to GO and RGO, it is believed that the incorporation of functionalised oxide-free graphene into coatings enables greater quantities of metallic pigments to be replaced.

The chemical linker may be provided in liquid form. The liquid may be an organic solvent, an organic solvent based solution, water or a water based solution. If the functionalised graphene is to be incorporated into an aqueous or water based coating composition, then it is preferable to provide the chemical linker in an aqueous or water based solution. On the other hand, if the functionalised graphene is to be incorporated into a solvent based coating composition it is preferable to provide the chemical linker in a solvent based system.

The chemical linker may comprise at least two functional groups. One functional group may be capable of reacting with the edge atoms of the graphene. Preferably the functional group for reacting with the edge atoms of graphene is an amine group which provides steric hindrance between the graphene platelets thereby assisting to stabilise the system. This chemical linkage also serves to improve graphene wettability and prevents a preferential thermodynamic stacking mode (e.g. ABA, ABB).

The second functional group may be capable of reacting with a binder in a coating composition. The second functional group may comprise an amino, hydroxyl, carboxylic acid or epoxy group. In some embodiments the chemical linker comprises an organosilane. In particular, the chemical linker may comprise an aminosilane or an aminoalkoxysilane such as APTES. The organosilane, aminosilaine or aminoalkoxysilane may be unhydrolysed.

The graphene may be sprayed with the chemical linker. Spraying graphene with the chemical linker instead of functionalising graphene in a liquid medium (water or solvent) reduces the amount of the chemical linker that is required for functionalising graphene. It is also understood that spraying reduces the risk of graphene nanoplatelets agglomerating which, if subsequently incorporated into a coating composition, would reduce the corrosion protective and mechanical properties of the coatings thus formed.

In some embodiments the method may comprise the step of adding a wetting agent and/or a dispersing agent prior to functionalising the graphene, preferably by spraying. The addition of the wetting and/or dispersing agent at this stage helps to ensure good wettability and dispersion of the graphene flakes during functionalisation when the functionalised graphene is incorporated in the binder and ultimately in the coating.

Although the wetting agent and the dispersing agents can be added at the same time, it is preferred to first add the wetting agent and then to add the dispersing agent in a subsequent step.

The wetting and/or dispersing agent may be solvent or water based. The wetting and/or dispersing agent may comprise any of the following functional groups: —$NH_2$, —OH, —O=C—NH, —$(NH_2)_2$ and —$(NH_2)_3$. It has been found that wetting and/or dispersing agents comprising amino, hydroxyl, carbonamide, diamine and triamine functional groups are very suitable for reacting with the edge electrons of graphene and as a result, improvements in corrosion protection can be obtained even when coatings contain reduced quantities of metallic pigments.

Examples of dispersing agents that may be used in accordance with the present invention include water based dispersing agents such as DisperBYK2010, DisperBYK2012, Disperbyk 2025, Anti terra 250, DisperBYK 190, Disperbyk 199, BYK093, BYK 2025, BYK1640, and CARBOWET® GA-100 (Evonik) and solvent based dispersing agents such as BYK9077. A preferred dispersing agent for a solvent based system is an alkylammonium salt of a high molecular-weight copolymer such as BYK 9076.

The wetting agent may comprise a polyether-modified poly-siloxane or modified polyacrylate, e.g. BYK 333 and BYK 3550.

The functionalisation of graphene may be carried out under an inert atmosphere. This helps to ensure that pristine graphene does not become oxidised or at least minimises the risk of oxidation which could be detrimental to the corrosion protective properties of coatings comprising functionalised graphene. If partially oxidised graphene or limited oxygen graphene is used, functionalising under an inert atmosphere helps to ensure that the oxygen content does not exceed 5%.

The functionalised graphene composition may be dried. The functionalised graphene may be dried under ambient conditions or it may be subjected to a heat treatment. The heat treatment may not exceed a temperature of 150° C. In some embodiments the step of drying the functionalised graphene may be carried out under an inert atmosphere, e.g. under a nitrogen atmosphere. This helps prevent or at least reduces the risk of the graphene becoming oxidised, especially if the functionalised graphene is being subjected to the heat treatment.

The step of functionalising graphene may be carried out in a fluidised bed, in a dry/wet mill or in a mechanical mixer.

According to a second aspect of the invention there is provided a functionalised graphene composition comprising the functionalised graphene produced according to the first aspect of the invention, wherein the functionalised graphene composition comprises 0.1-10 wt % of the chemical linker and graphene. In some embodiments the functionalised graphene composition may comprise 0.5-5 wt % of the chemical linker.

The functionalised graphene composition refers to the functionalised graphene produced according to the first aspect of the invention and may, as appropriate, include any or all features described in relation to the method according to the first aspect of the invention.

The functionalised graphene composition may comprise 0.1-10 wt % of the dispersing agent. In particular, the composition may comprise 0.1-5 wt % of the dispersing agent. In some embodiments the composition may comprise 0.5-5 wt % of the dispersing agent.

The functionalised graphene composition may comprise 0.1-5 wt % of the wetting agent. In particular, the composition may comprise 0.5-5 wt % of the wetting agent.

According to a third aspect of the invention there is provided a method of reducing the content of metallic pigments in a coating composition comprising metallic pigments and a binder, the method comprising the steps of replacing or omitting a proportion of the metallic pigments from the coating composition and replacing the metallic pigments with a filler and the functionalised graphene obtained from the method according to the first aspect of the invention or the functionalised graphene composition of the second aspect of the invention.

The method according to the third aspect of the invention refers to the functionalised graphene produced according to the first aspect of the invention and to the functionalised graphene composition according to the second aspect of the invention and may, as appropriate, include any or all features described in relation to the first and second aspects of the invention.

According to a fourth aspect of the invention there is provided a coating composition, the coating composition comprising:
 a binder;
 a metallic pigment;
 a filler; and
 functionalised graphene for at least partially replacing a proportion of the metallic pigments in the coating composition, wherein the functionalised graphene is the functionalised graphene obtained from the method according to the first aspect of the invention or the functionalised graphene composition according to the second aspect of the invention.

It has been found that the introduction of the functionalised graphene into a coating composition enables the content of metallic pigments in the coating composition to be reduced by at least 50 wt. % while improving the corrosion protective and mechanical properties of the coatings thus formed. Moreover, the incorporation of functionalised graphene results in a denser coating network with improved barrier and mechanical properties while simultaneously reducing the overall weight of the coatings thus formed.

The coating composition according to the fourth aspect of the invention refers to the functionalised graphene produced according to the first aspect of the invention and to the functionalised graphene composition according to the second aspect of the invention and may, as appropriate, include any or all features described in relation to the method according to the first and second aspects of the invention.

The coating composition may comprise 0.5-10 wt % of the functionalised graphene, while in other embodiments the coating composition may comprise 0.5-5 wt % of the functionalised graphene. In some embodiments the coating composition may comprise 1-2 wt % of the functionalised graphene.

The coating composition may comprise 5-90 wt % of the binder. In some embodiments the coating composition may comprise 5-50 wt % of the binder. For instance, the binder content may be 20-40 wt %. The binder may comprise a resin and a hardener. The resin may be an organic resin. In particular, the resin may comprise an epoxy resin and the hardener may comprise any of the following functional groups: amino, amide, hydroxyl, carboxylic acid, anhydride, isocyanate, phenol and thiol. In some embodiments the functionalised graphene may be pre-mixed with the hardener or binder depending on linker functionality.

The coating composition may comprise 5-90 wt % of the metallic pigment. In particular, the coating composition may comprise 5-50 wt %, 5-40 wt %, 5-30 wt %, 5-20 wt % or 5-10 wt % of the metallic pigment. The metallic pigment may comprise zinc or a zinc alloy, aluminium or an aluminium alloy, magnesium or a magnesium alloy, chromium or a chromium alloy, iron oxide or phosphate or a mixture of one or more of said metallic or conductive metal oxide pigments.

The filler may comprise $CaCO_3$, mica, titanium dioxide, talc, inert fillers or a mixture thereof. The presence of functionalised graphene in the coating composition means that the coating composition can be modified to contain reduced quantities of metallic pigments such as zinc. However, in order to preserve coating integrity, the filler content should be adjusted to compensate for the quantity of metallic pigment that has been removed/omitted from the coating composition and the presence of functionalised graphene.

The functionalised graphene may be pre-mixed with the metallic pigments and the filler. The mixture may also be pre-dispersed in a suitable solvent with a wetting and/or dispersing agent to ensure a uniform metal/graphene pre-mix. The mixture may then be added to the resin and/or hardener.

According to a fifth aspect of the invention there is provided a coated article, wherein the article comprises a coating layer formed from the coating composition according to the third aspect of the invention.

The coated article according to the fifth aspect of the invention refers to the coating composition according to the fourth aspect of the invention and may, as appropriate, include any or all features described in relation to the coating composition according to the fourth aspect of the invention.

The coating layer may have a dry film thickness of 1-150 microns. In particular, the coating layer may have a dry film thickness of 15-150 microns. The coating layer may be a primer. In particular, the coating layer may be a marine primer.

The article may comprise a metal substrate, an automotive vehicle, an aircraft, an electrical or domestic appliance, an offshore structure, a marine vessel or a dry dock. For example, the article may be a ship's hull, an offshore structure, or an offshore renewable energy structure.

According to a sixth aspect of the invention there is provided a method of producing a coated article, wherein the method comprises the step of applying the composition according to the fourth aspect of the invention to the surface of the article. Application of the composition may be by way of spraying, roller coating, brushing or screen printing and include any initial required surface preparation.

The method according to the sixth aspect of the invention refers to the coating composition according to the fourth aspect of the invention and to the coated article according to the fifth aspect of the invention and may, as appropriate, include any or all features described in relation to the coating composition according to the fourth aspect of the invention and the coated article of the fifth aspect of the invention.

According to a seventh aspect of the invention the functionalised graphene produced according to the first aspect of the invention is used as a replacement for metallic pigments in a coating layer comprising metallic pigments and a binder.

The use according to the seventh aspect of the invention refers to the functionalised graphene according to the first aspect of the invention and may, as appropriate, include any or all features described in relation to the first and second aspects of the invention.

According to an eighth aspect of the invention there is provided a method of preparing surface modified graphene, the method comprising the step of surface modifying graphene with a chemical linker when the graphene is in a substantially dry condition. The method according to the eighth aspect of the invention may include any or all features described in relation to the first aspect of the invention.

According to a ninth aspect of the invention there is provided a surface modified graphene composition comprising the surface modified graphene produced according to the eighth aspect of the invention. The surface modified graphene composition of the ninth aspect of the invention may include any or all features described in relation to the second aspect of the invention.

According to a tenth aspect of the invention there is provided a method of reducing the content of metallic pigments in a coating composition comprising metallic pigments and a binder, the method comprising the steps of replacing or omitting a proportion of the metallic pigments from the coating composition and replacing the metallic pigments with a filler and the surface modified graphene obtained from the method according to the eighth aspect of the invention or the functionalised graphene composition of the ninth aspect of the invention. The method according to the tenth aspect of the invention may, as appropriate, include any or all features described in relation to the first and second aspects of the invention.

According to an eleventh aspect of the invention there is provided a coating composition, the coating composition comprising:
 a binder;
 a metallic pigment;
 a filler; and
 surface modified graphene for at least partially replacing a proportion of the metallic pigments in the coating composition, wherein the surface modified graphene is the functionalised graphene obtained from the method according to the first aspect of the invention or the functionalised graphene composition according to the second aspect of the invention.

The coating composition according to the eleventh aspect of the invention may, as appropriate, include any or all features described in relation to the method according to the first second and fourth aspects of the invention.

According to a twelfth aspect of the invention there is provided a coated article, wherein the article comprises a coating layer formed from the coating composition according to the eleventh aspect of the invention. The coated article according to the twelfth aspect of the invention may, as appropriate, include any or all features described in relation to the coating composition according to the fourth aspect of the invention.

According to a thirteenth aspect of the invention there is provided a method of producing a coated article, wherein the method comprises the step of applying the composition according to the eleventh aspect of the invention to the surface of the article. The method according to the thirteenth aspect of the invention may, as appropriate, include any or all features described in relation to the coating composition according to the fourth aspect of the invention and the coated article of the fifth aspect of the invention.

According to a fourteenth aspect of the invention the functionalised graphene produced according to the eighth aspect of the invention is used as a replacement for metallic pigments in a coating layer comprising metallic pigments and a binder.

DETAILED DESCRIPTION OF THE INVENTION

In order that the invention may be more clearly understood, one or more embodiments thereof will now be described, by way of example only, with reference to the accompanying drawings, in which.

REACTION SCHEME FOR REDUCED ZINC CONTENT COATING

Figure 1:
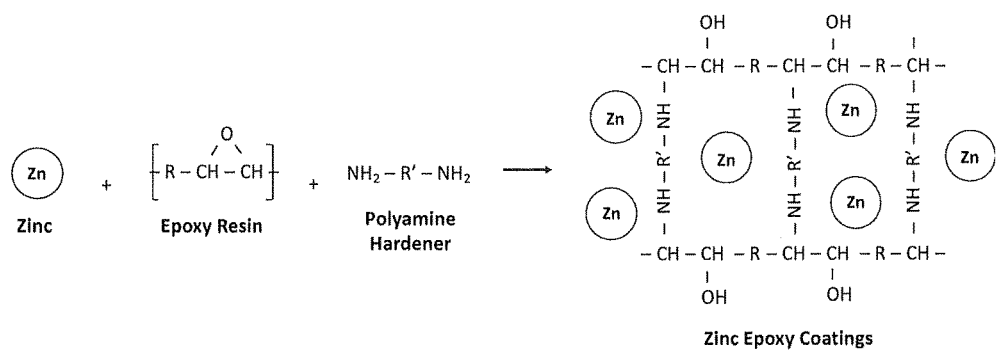
FIG. 1 shows a reaction scheme for producing a zinc epoxy coating according to the prior art.
Figure 2:
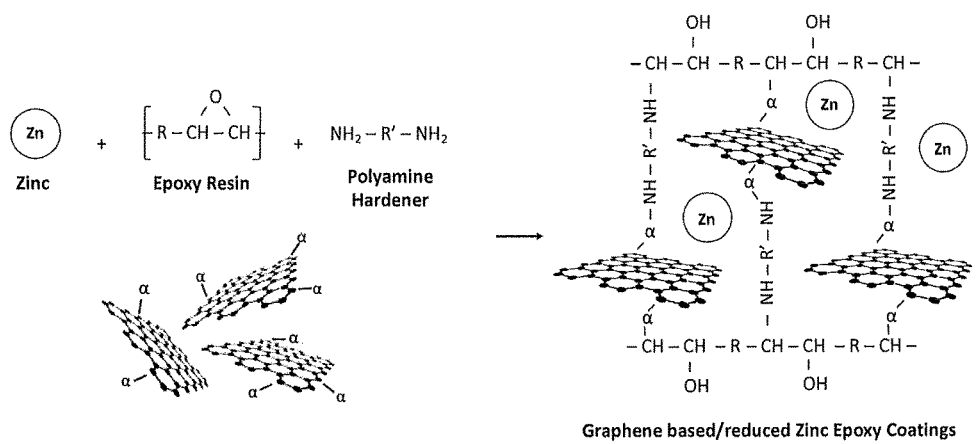
FIG. 2 shows a reaction scheme in accordance with the present invention for producing an epoxy coating with functionalised graphene and reduced quantities of zinc.

A reaction scheme for producing a zinc epoxy coating according to the prior art is shown in FIG. 1. As alluded to hereinbefore, while coatings with a high zinc content typically exhibit good corrosion protection, they can often suffer from a reduced service life, particularly in respect of epoxy/zinc coatings where the service life is limited by the zinc content in the coating. FIG. 2 depicts an improved reaction scheme to that depicted in FIG. 1. The reaction scheme shown in FIG. 2 involves mixing functionalised graphene with zinc, an epoxy resin and a polyamine hardener to produce a zinc epoxy coating with functionalised graphene. The incorporation of graphene into the epoxy coating network enables the content of zinc pigments in the epoxy coating to be reduced without any detrimental effect on corrosion protection (see FIGS. 1 and 2). FIG. 2 additionally shows that the functionalised graphene is chemically linked with the resin/hardener cross-linked structure. This not only increases the barrier protection properties of the zinc epoxy coatings, it also results in a denser coating network being formed with improved mechanical properties, all of which serve to minimise the service life issues experienced by the prior art zinc epoxy coating systems (FIG. 1) whilst offering other benefits such as reduced manufacturing costs and coating weight due to the reduced zinc content.

One embodiment of such an improved reaction scheme which includes functionalised graphene preparation and subsequent coating composition preparation components is described in further detail below.

Functionalised Graphene Preparation

Pristine, oxide-free graphene nanoplatelets (GNP) are functionalised by introducing GNP (94 wt %) into a LÖDIGE Ploughshare® Mixer in the form of a powder. The GNP powder is in a substantially dry condition and free from moisture. The mixer is then activated and as the GNP powder starts to atomise or deagglomerate it is sprayed with BYK 333 wetting agent, then (2 wt %), BYK 9076 dispersing agent (2 wt %) and then with APTES (4 wt %) to produce functionalised GNP powder. Following functionalisation of the GNP powder, it is subjected to a heat treatment of 50-100° C. in order to ensure complete functionalisation and to drive off any residual liquid that may be present. The heat treatment is carried out within the mixer in air or under a nitrogen atmosphere to minimise the risk of the functionalised pristine GNPs becoming oxidised.

Coating Composition Preparation

The functionalised GNP powder is mixed with the other powder components of the coating composition, namely zinc and $CaCO_3$. These powder components are then mixed with a bisphenol A diglycidyl ether (DGEBA) epoxy resin and polyamide hardener in the presence of xylene and this mixture is stirred for 5 minutes at 2000 RPM. The mixture is then spray-coated onto a steel substrate. The coated steel substrate is then cured at room temperature (i.e. 1.5 hours for through-drying and 7 days for complete curing) to form a coating having a dry film thickness of 60 microns. Exemplary compositions E1-E2 are shown in Table 1 below together with comparative examples C1 and C2.

The E1-E2 coatings were prepared in accordance with the above described methods. Comparative examples C1 and C2 are commercially available zinc based epoxy coating compositions, namely "Hempadur Avanguard 750" by Hempel (C1) and "Barrier ZEP" by Jotun (C2).

TABLE 1

|    | Zinc | Functionalized Graphene | Binder | Coating Thickness (Microns) |
| --- | --- | --- | --- | --- |
| C1 | 30% | 0 | 38% | 90 microns |
| C2 | 40% | 0 | 38% | 60 microns |
| E1 | 15% | 1% | 38% | 60 microns |
| E2 | 20% | 1.2% | 38% | 60 microns |

Figure 3:
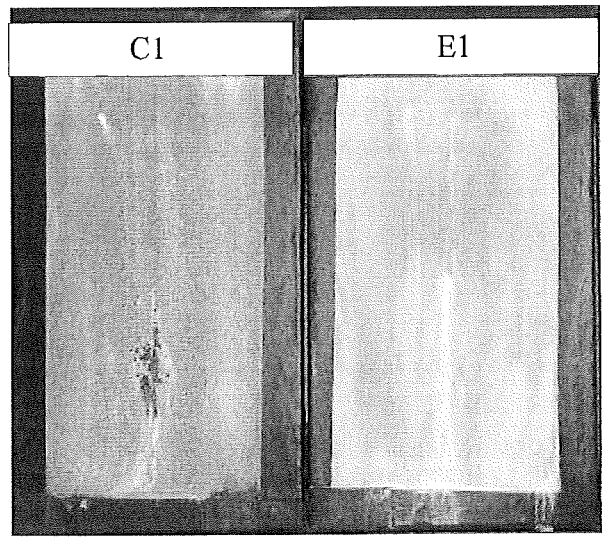
FIG. 3 shows salt spray test results after 1500 hours for zinc-containing epoxy coatings with and without functionalised graphene.

The coated substrates C1 and E1 were subjected to a salt spray test (ASTM B117) for 1500 hours to determine the corrosion resistant properties of the respective coatings. The results of the salt spray test (shown in FIG. 3) show that the E1 coating exhibits superior corrosion resistance relative to the C1 coating despite the E1 coating containing 50% less zinc and having a reduced layer thickness.

Figure 4:
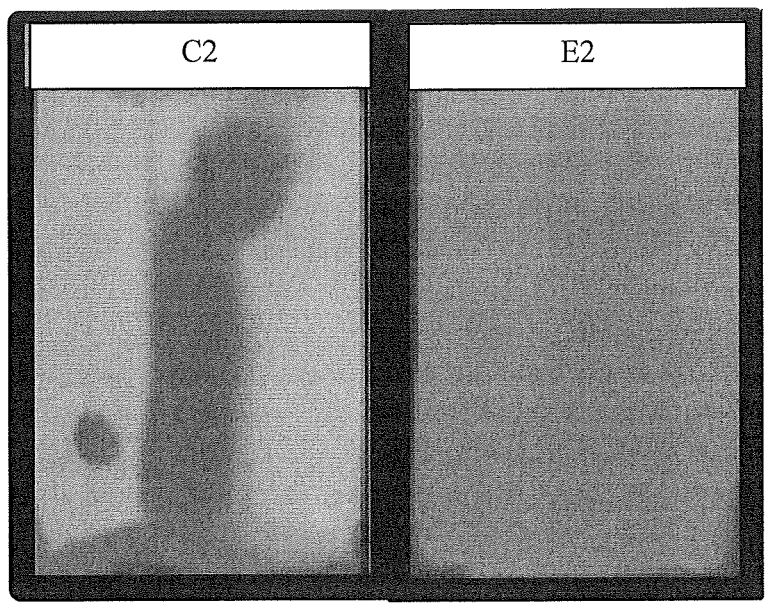
FIG. 4 shows further salt spray test results after 1500 hours for zinc-containing epoxy coatings with and without functionalised graphene.

The coated substrates C2 and E2 were also subjected to a salt spray test (ASTM B117) for 1500 hours to determine the corrosion resistant properties of the respective coatings. The results of this salt spray test (shown in FIG. 4) show that the E2 coating also exhibits superior corrosion resistance relative to the C2 coating despite the E2 coating containing 50% less zinc.

By way of the improved reaction scheme as depicted in FIG. 2, the present invention serves to reduce the metallic content in a coating composition (particularly of zinc) while providing enhanced corrosion resistance/protection and mechanical performance. Furthermore, reducing the metallic content can also facilitate a number of additional benefits including improved environmental sustainability (i.e. metallic pigments sacrificially result in corrosion products which can be toxic to marine environments, one reason why zinc rich epoxies are less preferred on underwater parts of vessels), enhanced lifetime (i.e. since metal pigments would eventually corrode while graphene would remain inert) and potential realisation of coating thickness/weight/cost reductions. Still further, other potential benefits of a coating composition produced by way of the improved reaction scheme may include enhancement of coating adhesion due to graphene reinforcement and denser crosslinking and improvements in impact and abrasion resistance.

The one or more embodiments of the present invention are described above by way of example only. Many variations are possible without departing from the scope of protection afforded by the appended claims.

For example, the present invention is also applicable to a range of other commercially available two-component products, including for example, those from Sherwin Williams (i.e. Macropoxy® L524, Macropoxy® C123, Spec M155), PPG (i.e. SigmaZinc 19, SigmaCover 522 MIO, SigmaCover 522), Jotun (i.e. Barrier 77, 90 & ZEP9), International Paints (i.e. Intergard® 263, Interzinc® 75V, Interzinc® 52, Intergard 343HS, Interseal® 670HS, Interzon® 5140, Intershield® 300) and Hempel (i.e. Hempadur Zinc 17360, Hempadur 1555 E, Zinc Rich Epoxy Primer 178US).

The invention claimed is:

1. A method of preparing functionalised graphene, the method comprising the step of functionalising an oxide-free graphene powder with a chemical linker for reacting with a resin and/or a hardener without dispersing the oxide-free graphene powder in a solvent, wherein the oxide-free graphene powder is sprayed with the chemical linker.

2. The method according to claim 1, wherein the method comprises the step of adding a wetting and/or dispersing agent to the functionalised oxide-free graphene powder.

3. The method according to claim 1, wherein the functionalisation of the oxide-free graphene powder is carried out under an inert atmosphere or in air.

4. The method according to claim 1, wherein the functionalised oxide-free graphene powder is dried.

5. The method according to claim 1, wherein the oxide-free graphene powder is functionalised in a fluidised bed, a dry/wet mill or in a mechanical mixer.

6. The method according to claim 1, wherein the chemical linker comprises an organosilane.

7. The method according to claim 1, wherein the method comprises the step of adding a wetting and/or dispersing agent to the functionalised oxide-free graphene powder by spraying.

8. The method according to claim 1, wherein the chemical linker comprises an unhydrolysed organosilane.

* * * * *